United States Patent
Peeters

(10) Patent No.: US 6,947,372 B2
(45) Date of Patent: Sep. 20, 2005

(54) MULTI-CARRIER COMMUNICATION SYSTEM WITH SAMPLE RATE PILOT CARRIER AND TIME DIVISION DUPLEXING FRAME RATE PILOT CARRIER

(75) Inventor: Miguel Peeters, Brussels (BE)

(73) Assignee: Alcatel, Paris (FR)

( * ) Notice: Subject to any disclaimer, the term of this patent is extended or adjusted under 35 U.S.C. 154(b) by 919 days.

(21) Appl. No.: 09/874,008

(22) Filed: Jun. 6, 2001

(65) Prior Publication Data

US 2001/0050960 A1 Dec. 13, 2001

(30) Foreign Application Priority Data

Jun. 7, 2000 (EP) ............................................ 00401607

(51) Int. Cl.⁷ ................................................. H04J 11/00
(52) U.S. Cl. ....................... 370/208; 370/206; 370/280
(58) Field of Search ................................ 370/203, 206, 370/208, 210, 280, 352, 484, 494, 495

(56) References Cited

U.S. PATENT DOCUMENTS

| | | | |
|---|---|---|---|
| 4,438,511 A | | 3/1984 | Baran |
| 5,285,443 A | | 2/1994 | Patsiokas et al. |
| 5,864,544 A | | 1/1999 | Serinken et al. |
| 5,896,425 A | | 4/1999 | Hirano et al. |
| 6,493,395 B1 | * | 12/2002 | Isaksson et al. ............. 375/261 |
| 6,618,352 B1 | * | 9/2003 | Shirakata et al. ............ 370/203 |
| 6,625,111 B1 | * | 9/2003 | Sudo ........................... 370/203 |
| 6,721,569 B1 | * | 4/2004 | Hashem et al. .............. 455/450 |

FOREIGN PATENT DOCUMENTS

| | | |
|---|---|---|
| EP | 0 820 171 A1 | 1/1998 |
| EP | 0 903 897 A1 | 3/1999 |
| WO | WO 98/10552 | 3/1998 |

OTHER PUBLICATIONS

John M. Cioffi et al, "Very–High–Speed Digital Subscriber Lines" IEEE Communications Magazine, Apr. 1999, pp. 72–79.

T. Nicholas Zogakis et al, "The effect of Timing Jitter on the Performance of a Discrete Multitone System", IEEE Transactions on Communications, vol. 44, No. 7, Jul. 1996, pp. 799–808.

Peter Gysel et al, "Timing Recovery in High Bit–Rate Transmission Systems Over copper Pairs", IEEE Transactions on Communications, Dec. 1998, vol. 46, No. 12, pp. 1583–1586.

Keyhyun Kim et al, "Symbol Timing Recovery Using Digital Spectral Line Method for 16–Cap VDSL System", 1998 IEEE, pp. 3467–3472.

* cited by examiner

*Primary Examiner*—Ricky Ngo
*Assistant Examiner*—Christine Ng
(74) *Attorney, Agent, or Firm*—Sughrue Mion, PLLC

(57) ABSTRACT

In a multi-carrier communication system wherein data are transferred bi-directionally in a time division duplexed way, a first pilot carrier is used to transfer a sample rate between two transceivers (VDSL_LT, VDSL_NT) and a second pilot carrier is used to transfer a time division duplexing frame rate between the two transceivers (VDSL_LT, VDSL_NT). The first pilot carrier has an instantaneous frequency that is a fraction of the sample rate of the first transceiver (VDSL_LT) and is orthogonal to other carriers used in the multi-carrier communication system. The second pilot carrier has a mean frequency that is a fraction of the time division duplexing frame rate and is also orthogonal to the other carriers used in the multi-carrier communication system. The second pilot carrier is different from the first pilot carrier.

6 Claims, 2 Drawing Sheets

MULTI-CARRIER COMMUNICATION SYSTEM WITH SAMPLE RATE PILOT CARRIER AND TIME DIVISION DUPLEXING FRAME RATE PILOT CARRIER

BACKGROUND OF THE INVENTION

The present invention relates to a multi-carrier communication system, a multi-carrier transmitter for use in such a multi-carrier communication system, and a multi-carrier receiver for use in such a multi-carrier communication system.

Such a multi-carrier system, multi-carrier transmitter, and multi-carrier receiver are already known in the art, e.g. from the article 'Very-High-Speed Digital Subscriber Lines' from the authors John M. Cioffi, Vladimir Oksman, Jean-Jacques Werner, Thierry Pollet, Paul M. P. Spruyt, Jacky S. Chow and Krista S. Jacobsen. This article was published in IEEE Communications Magazine in April 1999, and describes from page 75, right-hand column to page 77, left-hand column, a communication system that combines multi-carrier modulation (DMT or Discrete Multi Tone modulation) with time division duplexing (TDD or ping-pong). In such a time division duplexing system, downstream transmission and upstream transmission occur in different time intervals. For downstream transmission from a line termination at the central office to a network termination at the customer premises, the line termination occupies a first time interval: the downstream frame. For upstream transmission from the network termination at the customer premises to the line termination at the central office, the network termination occupies a second time interval: the upstream frame. The time division duplexing (TDD) frame timing and the sample timing of the line termination and the network termination have to be synchronised. In a DMT (Discrete Multi Tone) based system like the one known from the above cited article, sample timing is synchronised between the line termination and network termination through transmission of a pilot carrier whose instantaneous frequency is a fraction of the sampling rate, which is orthogonal to other carriers transferred in the multi-carrier system, and which is used in the line termination or the network termination to control a rotor and skip/duplicate unit, such as is described in European Patent Application EP 0 820 171, entitled 'Multicarrier transmitter or receiver with phase rotators'. To realise synchronisation of the TDD (Time Division Duplexing) frame timing, the clocks from which the TDD framing is derived at the line termination and at the network termination may be locked to an external clock, anywhere available, such as is proposed in U.S. Pat. No. 5,864,544 entitled 'TDD Communication System Which Receives Timing Signals from a Satellite and Automatically, Successively, Repetitively, and Alternatingly Transmits and Receives Compressed Signals in a Single Channel'. In the TDD based communication system that is described therein, two communicating transceivers derive the TDD frame timing from a timing signal available through satellites such as the global positioning system (GPS) clock. If however in a multi-carrier, time division duplexing system, the TDD frame timing would be derived from an externally available clock like is done in U.S. Pat. No. 5,864,544, the jitter of the external clock would degrade the signal to noise ratio for transmission of all carriers used in the multi-carrier system. The effect of timing jitter on the performance of multi-carrier systems is analysed for example in the article 'The Effect of Timing Jitter on the Performance of a Discrete Multitone System' from the authors T. Nicholas Zogakis and John M. Cioffi, an article that was published in the magazine 'IEEE Transactions on Communications', Vol. 44, No. 7, July 1996.

SUMMARY OF THE INVENTION

An object of the present invention is to provide a multi-carrier, time division duplexing communication system similar to the known one, but wherein degradation of the carriers used in the system due to jitter of an external clock where the time division duplexing frame timing is derived off, is avoided.

According to the present invention, this object is realised by the multi-carrier communication system, wherein a second pilot carrier whose mean frequency is a fraction of a time division duplexing frame rate and which is orthogonal to other carriers used in the multi-carrier communication system, is transferred from the first transceiver to the said second transceiver to enable the second transceiver to recover the time division duplexing frame rate, the second pilot carrier being different from the first pilot carrier.

The object of the invention is further realized by a multi-carrier transmitter wherein the multi-carrier transmitter further comprises:

second pilot carrier generation means, adapted to generate a second pilot carrier whose mean frequency is a fraction of a time division duplexing frame rate and which is orthogonal to other carriers transmitted by the transmitter, the second pilot carrier being different from the first pilot carrier; and second pilot carrier transmission means, coupled to the second pilot carrier generation means and adapted to transmit the second pilot carrier.

Finally, the object of the invention is further realized by a multi-carrier receiver, wherein said multi-carrier receiver further comprises second pilot carrier receiving means, adapted to receive a second pilot carrier whose mean frequency is a fraction of a time division duplexing frame rate and which is orthogonal to other carriers received by the multi-carrier receiver, the second pilot carrier being different from the first pilot carrier.

Indeed, a second pilot carrier, orthogonal to all other carriers and different from the pilot carrier that transfers the sample timing, with a mean frequency that is a fraction of the time division duplexing frame frequency, can transfer the TDD frame timing between the network termination and the line termination. At the transmitter's side the phase of the second pilot carrier thereto is rotated so that its mean frequency becomes a fraction of the TDD framing, and this phase rotation of the second pilot carrier is compensated for upon receipt by an additional rotor. Since the second pilot carrier is orthogonal to all other carriers, jitter of the clock where the TDD frame timing is derived off, degrades only the signal to noise ratio (SNR) of this second pilot carrier and not of the other carriers.

It is remarked that derivation of the TDD frame timing from a TDD synchronization signal generated by one transceiver (e.g. the base station of a mobile communication system) and received by a second transceiver (e.g. a mobile station) is also known from U.S. Pat. No. 5,285,443 entitled 'Method and Apparatus for Synchronizing a Time Division Duplexing Communication System'. The communication system described in U.S. Pat. No. 5,285,443 however is not a multi-carrier based system wherein the TDD frame timing signal constitutes a pilot carrier orthogonal to all other carriers in order to reduce the effect of jitter. U.S. Pat. No.

5,285,443 discloses a mobile communication system wherein the base station generates a duty-cycle TDD synchronisation signal that is broadcasted so that all mobile stations within the same area can synchronise their TDD frame timing with each other in order to avoid crosstalk between the signals received from or transmitted to different mobile stations. Transferring the TDD frame timing in a multi-carrier system via a synchronisation signal as defined in U.S. Pat. No. 5,285,433 would not solve the above mentioned jitter problem.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional, optional feature of the multi-carrier communication system according to the present invention is that the first pilot carrier is constituted by interpolating a plurality of carriers.

Thus, the first pilot carrier that transfers the sample rate between the line termination and the network termination may be constituted in the multi-carrier receiver by interpolating a plurality of received carriers. In this way, the effect of interferers on the sample rate synchronisation is reduced. The interpolation coefficients in an advantageous implementation are weights that are proportional to the signal to noise ratio's where the interpolated carriers are transferred with. The use of an interpolated first pilot carrier for sample rate synchronisation is described in European Patent Application EP 0 903 897, entitled 'Method and Arrangement to Determine a Clock Timing Error in a Multi-Carrier Transmission System, and Related Synchronisation Units'.

Another additional, optional feature of the multi-carrier communication system according to the present invention is that that the first pilot carrier and/or the second pilot carrier are/is randomised.

Thus, the first pilot carrier that transfers the sample rate and the second pilot carrier that transfers the TDD frame timing may be randomised, thereby enabling an equaliser that forms part of the multi-carrier receiver according to the present invention to stay trained.

Yet another optional feature of the multi-carrier communication system according to the present invention is that the first pilot carrier and/or said second pilot carrier are/is modulated with data.

Thus, instead of randomising the first and second pilot carriers, data may be modulated on the first and second pilot carriers, again enabling an equaliser in the multi-carrier receiver according to the present invention to stay trained, and further increasing the effective bandwidth of the communication medium since the pilot carriers used for transferring the sample rate and the TDD frame rate, now carry part of the data.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
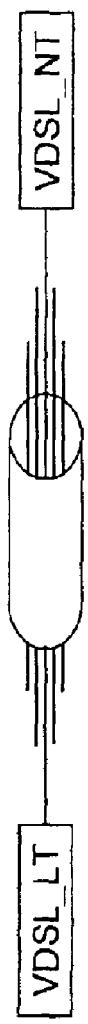
FIG. 1 depicts an embodiment of the multi-carrier communication system according to the present invention comprising a line termination VDSL_LT and a network termination VDSL_NT.

FIG. 1 shows a VDSL (Very High Speed Digital Subscriber Line) system comprising a line termination VDSL_LT located at the central office and a network termination VDSL_NT located at the customer premises. In this VDSL (Very High Speed Digital Subscriber Line) system, digital data are transferred bi-directionally in a time division duplexed (TDD) way, using discrete multi tone modulation (DMT). The line termination VDSL_LT and network termination VDSL_NT modulate the data on a set of orthogonal carriers and transmit these carriers respectively during a downstream time frame and an upstream time frame. The line termination VDSL_LT uses a first pilot carrier to transfer the sample rate to the network termination VDSL_NT and a second pilot carrier to transfer the TDD frame rate to the network termination VDSL_NT. To explain in detail how this is done, the transmitting part of the line termination VDSL_LT and the receiving part of the network termination VDSL_NT are drawn in detail in FIG. 2 and FIG. 3 respectively.

Figure 2:
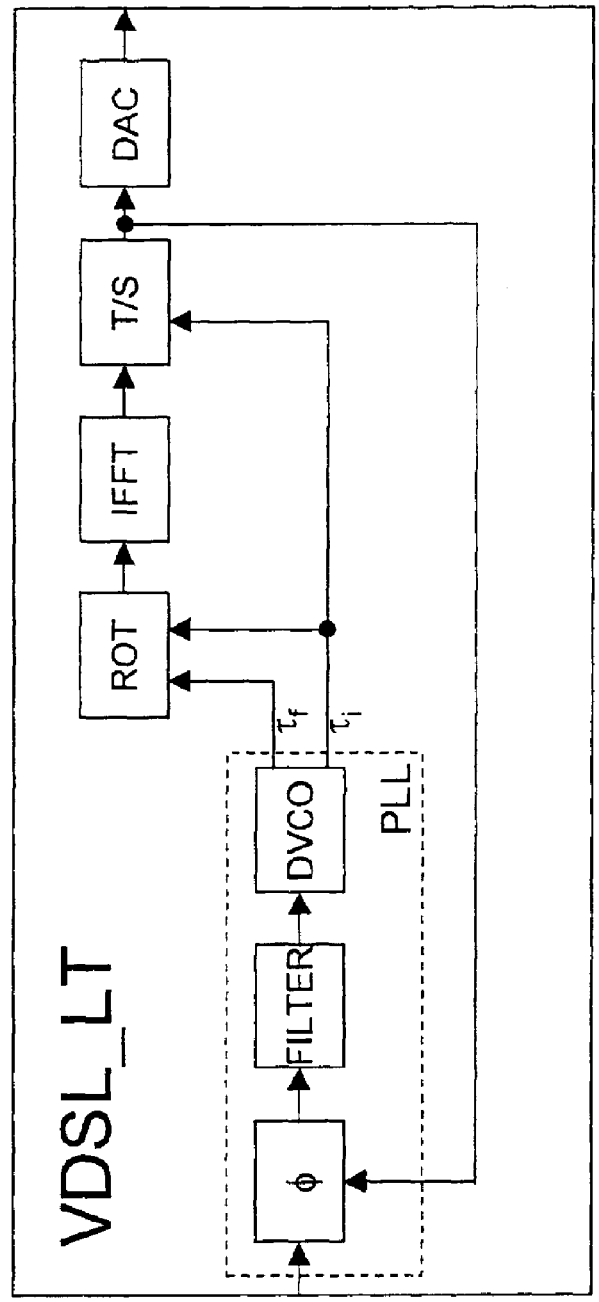
FIG. 2 is a functional block scheme of an embodiment of the multi-carrier transmitter according to the present invention incorporated in the line termination VDSL_LT of the communication system drawn in FIG. 1.

The line termination VDSL_LT drawn in FIG. 2 contains, coupled between a data input terminal not drawn in FIG. 2 and its output terminal that is connected to the telephone line, the cascade connection of a phase rotor ROT, an inverse fast Fourier transformer IFFT, a trim/stretch unit T/S and a digital to analogue converter DAC. A phase locked loop PLL incorporated in the line termination VDSL_LT has a first input terminal that serves as the external TDD frame timing input, a second input terminal whereto an output of the trim/stretch unit T/S is feedback coupled, a first output terminal connected to a first control terminal of the phase rotor ROT, and a second output terminal connected to a second control terminal of the phase rotor ROT and a control terminal of the trim/stretch unit T/S. The phase locked loop PLL comprises between its input terminals and its output terminals the cascade connection of a phase comparator $\phi$, a filter FILTER and a digital voltage controlled oscillator DVCO.

The phase locked loop PLL in the line termination VDSL_LT determines the phase difference between the external TDD frame timing signal, e.g. an SDH (Synchronous Digital Hierarchy) clock signal or the GPS (Global Positioning System) clock signal or a derivative thereof, and the second pilot carrier at the output of the trim/stretch unit T/S. From this phase difference, a phase error $\tau$ is generated indicative for the amount of sample periods that this phase difference counts. The fractional part $\tau_f$ of this phase error $\tau$ is supplied to the first control terminal of the phase rotor ROT, whereas the integer part $\tau_i$ of this phase error τ is supplied to the second control input of the phase rotor ROT and the control terminal of the trim/stretch unit T/S. It is noticed that this integer part $\tau_i$ of the phase error τ can have the value −1, 0 or 1. The rotor ROT and trim/stretch unit T/S have the task to lock the phase of the second pilot carrier to that of the external TDD frame timing signal so that the mean frequency $f_{mean,k2}$ of the second pilot carrier, i.e. the average frequency of the second pilot carrier over a number of DMT (Discrete Multi Tone) symbols, becomes a fraction of the TDD frame frequency. Thus $n.f_{mean,k2}=m.f_F$ with n and m being two positive integers, k2 being the index of the second pilot carrier, and $f_F$ being the TDD frame frequency. As long as the integer part $\tau_i$ remains 0, no trim/stretch operation has to be performed. The phase rotor ROT then phase rotates the second carrier by $\pm 2\pi k_2 \tau_f$ radians (herein $k_2$ represents the index number of the second pilot carrier in the complete set of carriers that is used for transmission between the line termination VDSL_LT and the network termination VDSL_NT), and leaves all other carriers unchanged. Whether the + or − sign is used for the rotation depends on the leading or lagging behind of the phase of the second pilot carrier versus the phase of the external TDD frame timing signal. In case the integer part $\tau_i$ becomes −1 or 1, the trim/stretch unit T/S either deletes or duplicates a sample. Furthermore the phase rotor ROT now phase rotates the second pilot carrier by $\pm 2\pi k_2 \tau_f$ radians and all other carriers by $\pm 2\pi k \tau_i$ radians (k represents the index number of each respective carrier), the latter operation compensating for all carriers but the second pilot carrier the sample deletion or duplication from the trim/stretch unit T/S so that these carriers again leave the line termination VDSL_LT unchanged. The inverse fast Fourier transformer converts the frequency domain representation of the multi-carrier signal into a time domain representation, and is a well-known component in a DMT (Discrete Multi Tone) modulator. The digital multi-carrier signal at the output of the trim/stretch unit T/S comprising the adjusted second pilot carrier is made analogue by the digital to analogue converter DAC. All carriers in this multi-carrier signal are orthogonal and have instantaneous frequencies that are fractions of the sampling rate. Thus the instantaneous frequency $f_{inst,k2}$ of the second pilot carrier is a fraction of the sample rate so that:

$$N.f_{inst,k2}=k_2.f_S$$

with N being the total number of carriers and $f_S$ being the sample frequency or sample rate. Any other carrier can be selected as the first pilot carrier, i.e. the carrier that transfers the sample rate between the line termination VDSL_LT and the network termination VDSL_NT since each carrier's frequency satisfies the equation:

$$N.f_{inst,k1}=k_1.f_S$$

Herein, k1 represents the index of the carrier selected as the first pilot carrier in the total set of carriers used for transmission between the line termination VDSL_LT and the network termination VDSL_NT and $f_{inst,k1}$ represents the instantaneous frequency of this first pilot carrier and Alternatively, even a linear combination of a number of carriers, not including the second pilot carrier, can serve as the first pilot carrier transferring the sample rate between the line termination VDSL_LT and the network termination VDSL_NT. It is up to the receiver in the network termination VDSL_NT to decide from which carrier or combination of carriers it will derive the sample rate.

Figure 3:
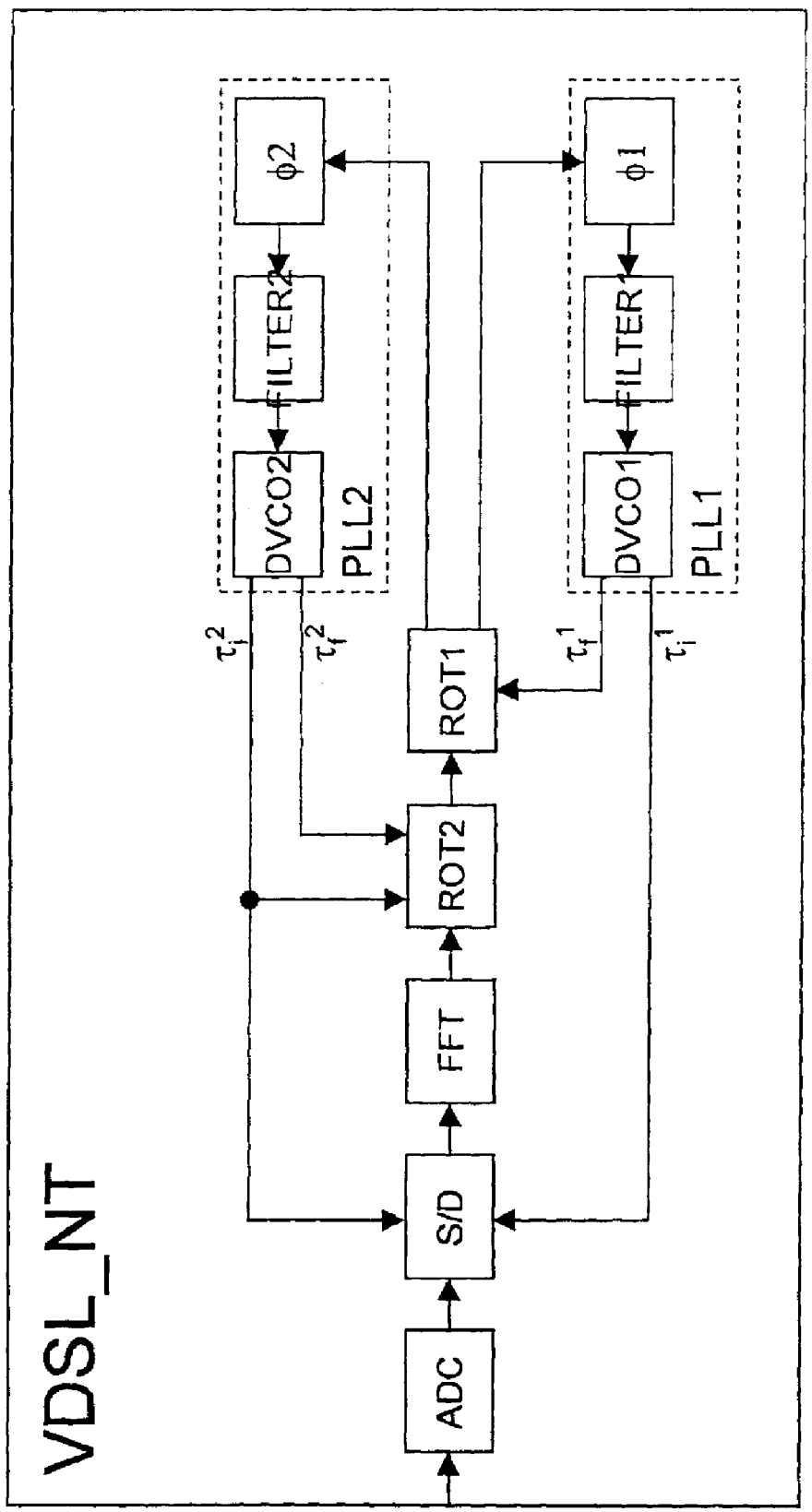
FIG. 3 is a functional block scheme of an embodiment of the multi-carrier receiver according to the present invention incorporated in the network termination VDSL_NT of the communication system drawn in FIG. 1.

The network termination VDSL_NT drawn in FIG. 3 contains, coupled to its input terminal that is connected to the telephone line, the cascade connection of an analogue to digital converter ADC, a skip/duplicate unit S/D, a fast Fourier transformer FFT, a second phase rotor ROT2, and a first phase rotor ROT1. To outputs of the first phase rotor ROT1, a first phase locked loop PLL1 consisting of a first phase comparator φ1, a first filter FILTER1 and a first digital voltage controlled oscillator DVCO1, and a second phase locked loop PLL2 consisting of a second phase comparator φ2, a second filter FILTER2, and a second digital voltage controlled oscillator DVCO2 are coupled. An integer output $\tau_i^1$ of the first digital voltage controlled oscillator DVCO1 is feedback coupled to a control terminal of the skip/duplicate unit S/D. A fractional output $\tau_f^1$ of the first digital voltage controlled oscillator DVCO1 is feedback coupled to a control terminal of the first phase rotor ROT1. An integer output $\tau_i^2$ of the second digital voltage controlled oscillator DVCO2 is feedback coupled to control terminals of the skip/duplicate unit S/D and the second phase rotor ROT2. A fractional output $\tau_f^2$ of the second digital voltage controlled oscillator DVCO2 is feedback coupled to a control terminal of the second rotor ROT2.

The analogue multi-carrier signal received by the network termination VDSL_NT is sampled by the analogue to digital converter ADC. The fast Fourier transformer FFT transforms the multi-carrier signal from time domain to frequency domain. The first phase rotor ROT1 in combination with the skip/duplicate unit S/D compensates for the sample rate differences between the transmitter in the line termination VDSL_LT and the receiver in the network termination VDSL_NT. Thereto, the first phase locked loop PLL1 (i.e. the first phase comparator φ1, the first filter FILTER1, and the first digital voltage controlled oscillator DVCO1) generates a sample rate timing error $\tau^1$ from the first pilot carrier, expressed as a number of sample periods of the receiver sample clock. The first phase locked loop thereto measures the phase difference between the first pilot carrier and a first expected pilot carrier. The resulting phase difference is a measure for the sample clock timing error between the line termination VDSL_LT and the network termination VDSL_NT. The integer part $\tau_i^1$ of this first phase error $\tau^1$ is supplied as a control signal to the skip/duplicate unit S/D via the integer output of the first digital voltage controlled oscillator DVCO1, whereas the fractional part $\tau_f^1$ of the first phase error $\tau^1$ is supplied as a control signal to the first phase rotor ROT1 via the fractional output of the first digital voltage controlled oscillator DVCO1. The first phase rotor ROT1 rotates all carriers by $\pm 2\pi k \tau_f^1$ radians, where k represents the index of each carrier. If the integer part $\tau_i^1$ of the first phase error $\tau^1$ equals −1 or 1, the skip/duplicate unit S/D either deletes or duplicates a sample. The working of the first phase rotor ROT1 and skip/duplicate unit S/D under control of the first phase locked loop PLL1 to compensate for the difference in sample rate between the transmitter and receiver is described more detailed in European Patent Application EP 0 820 171, already cited above. The second phase rotor ROT2 in combination with the skip/duplicate unit S/D compensates for the effect of the phase rotor ROT and the trim/stretch unit T/S in the line termination VDSL_LT on the second pilot carrier. Thereto, the second phase locked loop PLL2 (i.e. the second phase comparator φ2, the second filter FILTER2, and the second digital voltage controlled oscillator DVCO2) generates a phase error $\tau^2$ of the second pilot carrier, expressed as a number of sample periods of the receiver sample clock. The integer part $\tau_i^2$ of this second phase error $\tau^2$ is supplied as a control signal to the skip/duplicate unit S/D and the second phase rotor ROT2 via the integer output of the second digital voltage controlled oscillator DVCO2, whereas the fractional part $\tau_f^2$ of the second phase error $\tau^2$ is supplied as a control signal only to the second phase rotor ROT2 via the fractional output of the second digital voltage controlled oscillator DVCO2. As long as the integer part $\tau_i^2$ of the second phase error $\tau^2$ remains 0, no skip/duplicate action is required. The second rotor ROT2 phase rotates the second pilot carrier by $\pm 2\pi k_2 \tau_f^2$ and leaves all other carriers unchanged. As soon as the integer part $\tau_i^2$ of the second phase error $\tau^2$ becomes −1 or 1, the skip/duplicate unit S/D either deletes or duplicates a sample. The second rotor ROT2 now phase rotates the second pilot carrier by $\pm 2\pi k_2 \tau_f^2$ and phase rotates all other carriers by $\pm 2\pi k \tau_i^2$, where k represents the index of each respective carrier. The latter operation of the second phase rotor ROT2 compensates for all carriers but the second pilot carrier for the sample deletion or duplication the skip/duplicate unit S/D so that all carriers but the second pilot carrier are left unchanged by the combination of the skip/duplicate unit S/D and the second phase rotor ROT2. Concluding, the second pilot carrier is adapted in the transmitter by the phase rotor ROT and the trim/stretch unit T/S so that its mean frequency $f_{mean,k2}$ becomes indicative for the TDD frame frequency $f_F$, and the effect of the phase rotor ROT and the trim/stretch unit T/S is cancelled in the receiver by the second rotor ROT2 and the skip/duplicate unit S/D. From the received second pilot carrier the network termination VDSL_NT can derive the TDD frame timing so that the network termination VDSL_NT becomes TDD synchronised with the line termination VDSL_LT. Since the second pilot carrier is not used to recover the sample rate (used in the receiver to sample the incoming multi-carrier signal), jitter or noise on the TDD frame timing affects only the second pilot carrier and not any of the other carriers. Sample rate and TDD frame timing are transferred independently of one another from the line termination VDSL_LT to the network termination VDSL_NT.

It is noticed that instead of discrete multi tone modulation, alternative multi-carrier modulation techniques may be applied in a system wherein the present invention is applicable. In time division duplexed (TDD) based systems wherein for instance the Zipper technique or the OFDM (Orthogonal Frequency Division Multiplexing) technique is used to modulate a set of carriers with digital data, a first pilot carrier, orthogonal to all others, may be allocated for sample rate synchronisation purposes and a second pilot carrier, orthogonal to all others, may be allocated for TDD frame rate synchronisation purposes.

It is also noticed that although the sample rate and the TDD frame rate were transferred from the line termination VDSL_LT at the central office to the network termination VDSL_NT at the customer premises in the above described embodiment, one could imagine that alternatively the sample rate and TDD frame rate can be transferred from the network termination VDSL_NT to the line termination VDSL_LT. Applicability of the present invention is clearly not restricted to any of these two alternatives.

Although reference was made above to VDSL (Very High Speed Digital Subscriber Line) technology used for transmission over twisted pair telephone lines, any skilled person will appreciate that the present invention also can be applied in other DSL (Digital Subscriber Line) systems such as ADSL (Asynchronous Digital Subscriber Line), SDSL (Synchronous Digital Subscriber Line) systems, HDSL (High Speed Digital Subscriber Line) systems, and the like or in cable based, a fibre based or a radio based communication systems, provided that a multi-carrier linecode is used for transmission of data thereover in a time division duplexed (TDD) way.

Furthermore, it is remarked that an embodiment of the present invention is described above rather in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

What is claimed is:

1. Multi-carrier communication system wherein data are transferred bi-directionally in a time division duplexed way, and wherein a first pilot carrier whose instantaneous frequency is a fraction of a sample rate of a first transceiver (VDSL_LT) and which is orthogonal to other carriers used in said multi-carrier communication system, is transferred to enable a second transceiver (VDSL_NT) to recover said sample rate, CHARACTERISED IN THAT a second pilot carrier whose mean frequency is a fraction of a time division duplexing frame rate and which is orthogonal to other carriers used in said multi-carrier communication system, is transferred from said first transceiver (VDSL_LT) to said second transceiver (VDSL_NT) to enable said second transceiver (VDSL_NT) to recover said time division duplexing frame rate, said second pilot carrier being different from said first pilot carrier.

2. Multi-carrier communication system according to claim 1,

CHARACTERISED IN THAT said first pilot carrier is constituted by interpolating a plurality of carriers.

3. Multi-carrier communication system according to claim 1,

CHARACTERISED IN THAT said first pilot carrier and/or said second pilot carrier are/is randomised.

4. Multi-carrier communication system according to claim 1,

CHARACTERISED IN THAT said first pilot carrier and/or said second pilot carrier are/is modulated with data.

5. Multi-carrier transmitter (VDSL_LT) suitable for use in a time division duplexing system, said multi-carrier transmitter (VDSL_LT) comprising:

a. first pilot carrier generation means (IFFT, DAC), adapted to generate a first pilot carrier whose instantaneous frequency is a fraction of a sample rate and which is orthogonal to other carriers transmitted by said transmitter (VDSL_LT); and b. first pilot carrier transmission means, coupled to said first pilot carrier generation means (IFFT, DAC) and adapted to transmit said first pilot carrier, CHARACTERISED IN THAT said multi-carrier transmitter (VDSL_LT) further comprises:

c. second pilot carrier generation means (ROT, IFFT, T/S, DAC, PLL), adapted to generate a second pilot carrier whose mean frequency is a fraction of a time division duplexing frame rate and which is orthogonal to other carriers transmitted by said transmitter, said second pilot carrier being different from said first pilot carrier; and d. second pilot carrier transmission means, coupled to said second pilot carrier generation means (ROT, IFFT, T/S, DAC, PLL) and adapted to transmit said second pilot carrier.

6. Multi-carrier receiver (VDSL_NT) suitable for use in a time division duplexing system, said multi-carrier receiver (VDSL_NT) comprising:

a. first pilot carrier receiving means (ADC, S/D, FFT, ROT1, PLL1), adapted to receive a first pilot carrier whose instantaneous frequency is a fraction of a transmitter sample rate and which is orthogonal to other carriers received by said multi-carrier receiver (VDSL_NT), CHARACTERISED IN THAT said multi-carrier receiver (VDSL_NT) further comprises:

b. second pilot carrier receiving means (ADC, S/D, FFT, ROT2, ROT1, PLL1, PLL2), adapted to receive a second pilot carrier whose mean frequency is a fraction of a time division duplexing frame rate and which is orthogonal to other carriers received by said multi-carrier receiver (VDSL_NT), said second pilot carrier being different from said first pilot carrier.

* * * * *